Feb. 1, 1938.  F. B. LOMAX  2,107,040
PROCESS OF FILTERING EGGS
Original Filed Jan. 26, 1935
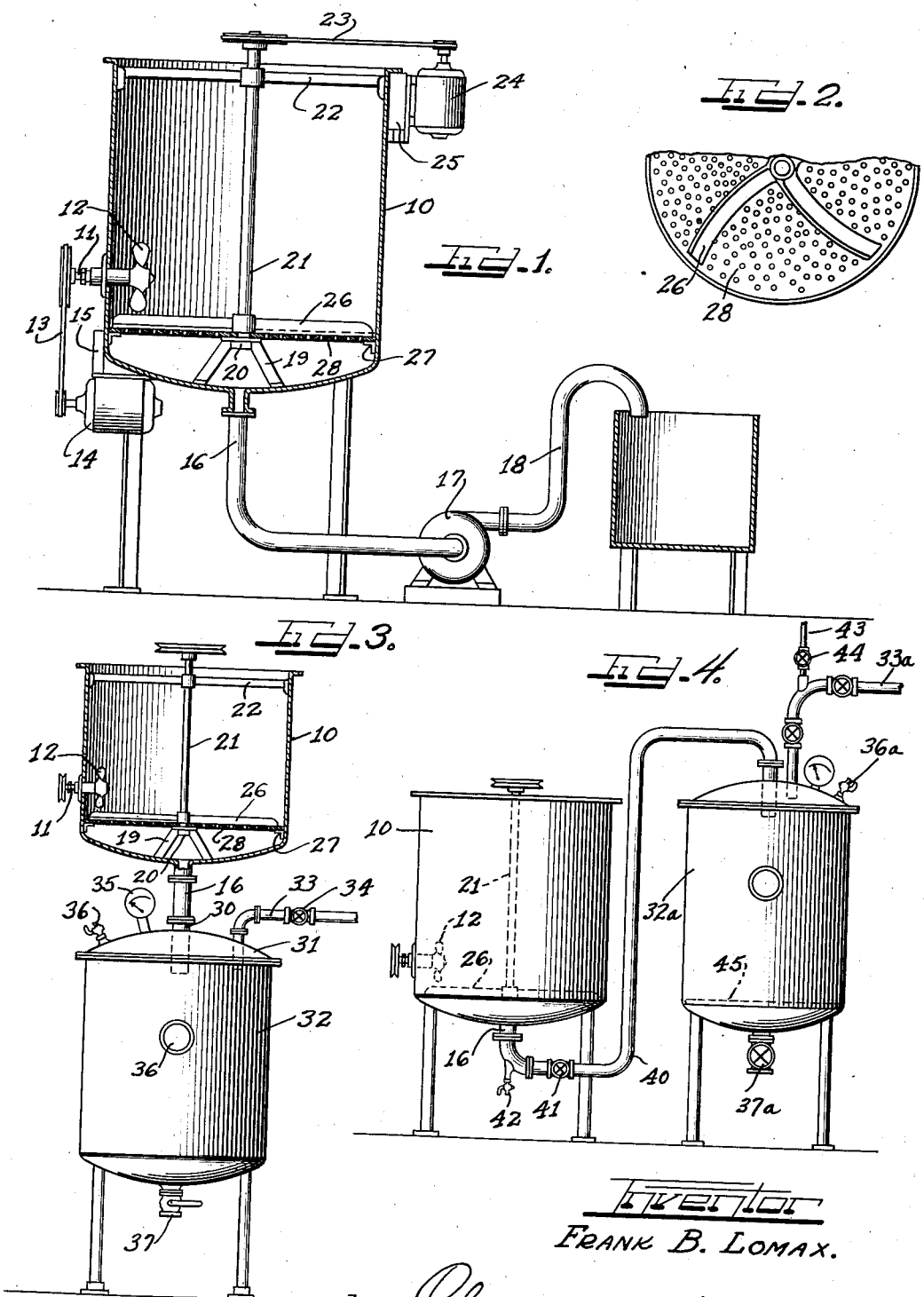
Inventor
FRANK B. LOMAX.
by Charles Cushwell Attys.

Patented Feb. 1, 1938

2,107,040

UNITED STATES PATENT OFFICE 2,107,040

PROCESS OF FILTERING EGGS

Frank B. Lomax, Chicago, Ill.

Original application January 26, 1935, Serial No. 3,601. Divided and this application May 7, 1936, Serial No. 78,336

REISSUED

4 Claims. (Cl. 99—113)

This invention relates to a process of separating egg meats from shell fragments without the use of mechanically applied pressure.

More specifically this invention relates to a process for filtering eggs free from shell fragments, dirt, and hard fibrous substances comprising in part the yolk sac of the egg by the aid of atmospheric pressure.

This application is a division of my copending application filed January 26, 1935, entitled "Apparatus for filtering eggs", Serial No. 3,601.

In the separation of egg meats for freezing and storage it is desirable to uniformly mix the egg meats and to free the mixture from fragments of egg shells, lumps, and unbroken chalaza. It has heretofore been proposed to forcibly pump the egg meats through a filter to effect a separation of shell fragments from the egg meats. However, the use of a pump incorporates air into the mixture and results in production of a foamy and frothy mass which is unsuitable for freezing and storing.

In this invention the pumping of the egg meats is entirely dispensed with and the filtration is effected by the aid of atmospheric pressure and gravity.

According to the present process the eggs are broken and separated from the shells in the usual manner. Either the whole egg meats, yolks, or the whites are used and are placed in a mixing tank. In this tank any seasoning ingredients such as salt, sugar or the like can be added. The eggs are thoroughly mixed in the tank by an agitator which acts on the egg meats at the bottom of the tank so as to prevent an incorporation of air into the mass.

The uniformly mixed egg meats are then flowed, preferably by gravity, to an egg filter where they are forced through the filter by atmospheric pressure alone. The force of the atmosphere is made effective by presenting a vacuum to the unloaded side of the filter. The porosity of the filter is sufficiently fine so that the egg meats will not run freely therethrough.

The filtered eggs may be stored temporarily and drawn off into cans for extended storage and freezing. The filter apparatus is equipped with means such as a scraper to keep the filter bed clean so that it will not clog up and prevent the passage of egg meats therethrough.

It is then an object of the present invention to provide a process for filtering eggs by suction.

Another object of this invention is to provide a process for efficiently separating eggs from shell fragments and other foreign material involving the use of atmospheric pressure to force the eggs through a filter means.

Another object of this invention is to provide a process for forcing egg meats through a filter having a porosity adapted to remove appreciable portions of egg shells and to disintegrate or remove the egg chalaza from the egg meats without the aid of pumps for propelling the egg meats.

Other and further objects of this invention will become apparent from the following detailed description of the annexed sheet of drawings which discloses apparatus designed to carry out the process of this invention.

On the drawing:

Figure 1 is a diagrammatical vertical cross-sectional view, with parts in elevation, of one form of apparatus used in carrying out the process of this invention.

Figure 2 is a fragmentary plan view of the scrapers and associated filter used in the apparatus illustrated in Figure 1.

Figure 3 is a side elevational view, with parts in vertical cross section, illustrating diagrammatically another form of apparatus used in carrying out the process of this invention.

Figure 4 is a side elevational view illustrating diagrammatically still another embodiment of apparatus suitable for effecting the process of this invention.

As shown on the drawing:

In the following description of the apparatus shown on the drawing identical reference characters have been used to designate similar parts in the various modifications of the apparatus.

In Figure 1 the reference numeral 10 indicates a tank or hopper of suitable depth and having an apertured side wall through which a shaft 11 is journalled. Within the tank 10, the shaft 11 has a propeller 12 thereon for mixing egg material placed in the tank. At the other end of the shaft 11 a pulley is secured to receive a belt 13 driven by a motor 14 which may be suspended on a bracket 15 or in any other suitable manner beneath the tank 10 or in juxtaposition thereto.

The bottom central section of the tank 10 opens into a conduit 16 which extends to a suction pump 17 suitably mounted upon a base. The suction pump 17 has a discharge conduit 18 whereby egg material which is drawn from the tank by the pump 17 is deposited in a can or other suitable receptacles provided for this construction.

A spider 19 is mounted at the central interior portion of the tank 10 and provides a journal 20 for a vertical shaft 21. The shaft 21 is journalled in a second spider or arbor 22 adjacent the top of the tank 10. The shaft 21 is provided with a pulley having a belt 23 entrained therearound driven by a motor 24 which can be suitably mounted on a bracket 25 at the side of the tank 10.

The lower end of the shaft 21 has one or more scrapers 26 thereabout of the type shown in plan view in Figure 2. Each scraper 26 is curved longitudinally and transversely to provide a suitable pitch tending to force material with which it comes into contact through the filter. An angle iron rack or other support 27 is mounted about the internal periphery of the tank in a horizontal plane near its bottom. Disposed upon the support 27 is a perforate disk 28 comprising a filter. The filter 28 in addition to being supported about its edges by rack 27 is supported at its central portion by the arbor 19. Suitable fastening means (not shown) may lock the filter in position. The filter 28 is thus securely mounted against movement.

If desired the filter may be divided into segments, the edges of which are overlapping or tightly sealed. A segmental arrangement facilitates removal of the filter for cleansing.

The filter can be made of perforated sheet metal or of wire mesh. If desired the wire mesh can be reinforced. The porosity of the filter is such that appreciable portions of egg shell and other solid bodies will not pass therethrough. Furthermore the filter will either disintegrate the egg chalaza or remove the same or disintegrate a part of it and remove the remaining portion thereof.

The process of this invention as carried out in the apparatus of Figure 1 is as follows:

Egg meats are poured into the tank 10. These may be whole eggs, or may be the yolks of eggs, or may be the whites of eggs. The propeller 12 within the tank 10 is then set in motion so that it will stir the eggs in the tank. Since the propeller acts on the egg meats out of contact with the atmosphere the meats will not be whipped or stirred into a foamy or frothy mass.

After the egg meats are mixed uniformly by the propeller 12 the suction pump 17 is energized to create a vacuum beneath the filter 28. The vacuum so created causes the pressure of the atmosphere above the filter to force the egg material on the filter therethrough leaving behind the unbroken chalaza, lumps, egg shells and other forms of solid material which will not readily pass through the filter. During the operation of the device the scraper 26 may be rotated continuously or at intervals. The scraper releases portions of materials on the screen that have been partly drawn through the filter but which are held by cohesion with other portions thereof so that they cannot be drawn entirely through the filter. The scraper cuts the unfiltered portion from the partly filtered portion, moves the unfiltered portion away from its position on the filter to prevent the same from clogging up the filter and forces egg meats through the filter. It is therefore desirable to have the mixing propeller 11, the scraper and the suction pump functioning concurrently.

The egg material which is drawn through the filter by suction or is forced through by the scrapers passes into the conduit 16 into the pump 17 and is discharged through a conduit 18 into a suitable can or storage tank.

In the embodiment of the apparatus shown in Figure 3 the hopper 10 is identical with the tank or hopper 10 shown in Figure 1 and the other parts in the hopper having identical reference numerals are identical with the parts in Figure 1. However, in the embodiments shown in Figure 3 the discharge conduit 16 communicates with a sleeve 30 carried in the central portion of a cover 31 for a closed vacuum tank 32. The connections between the conduit 16 and the sleeve 30 are air-tight. In the cover 31 there may be provided a suction line 33 controlled by a valve 34 for evacuating the interior of the tank 32.

The cover 31 also carries a vacuum gauge 35 and a vacuum breaker 36 which comprises the small valve or pet cock. A sight glass 36 can be mounted in the tank 32 to permit the operator to view the interior of the tank. A drain 37 is provided at the bottom of the tank 32 for removing the filtered eggs contained therein.

The process of this invention as carried out in the embodiment of the apparatus shown in Figure 3 is as follows:

Egg material, either whole eggs, egg yolks, or egg whites is deposited in the mixing and filtering tank 10 and uniformly mixed therein as described in connection with Figure 1. A vacuum pump is then put in operation to evacuate the tank 32 by withdrawing the air therefrom. When a suitable vacuum has been created as indicated in the vacuum gauge 35, egg material is drawn through the filter 28 and flows into the evacuated tank 32 where it is collected for subsequent storage. When all of the contents of the tank 10 have been filtered or when the tank 32 is filled to capacity, the vacuum pump is shut off, the valve 34 is closed, the vacuum breaker 36 is opened, and the egg material is then ready to be withdrawn through the drain 37.

The third form of an apparatus suitable for carrying out the process of this invention which is illustrated in Figure 4 makes use of a mixing tank 10 equipped in the same manner described in connection with Figure 1. In this modification, however, the drain conduit 16 communicates with a discharge conduit 40 having a valve 41 therein controlling the discharge therethrough. A drain cock 42 is provided ahead of the valve 41 for draining the tank 10 after use and during a cleaning operation.

An evacuator tank 32a substantially identical with the tank 32 described in Figure 3 is mounted alongside of the tank 10 instead of under the tank 10 as shown in Figure 3. The tank 32a is evacuated through a valved pipe line 33a and is drained through a drain valve 37a.

The evacuating line 33a, however, communicates with a valved conduit 43 having a valve 44 therein. The conduit 41 can be supplied with compressed air, carbon dioxide, nitrogen or other gas to force the contents collected in the tank 32a through a screen 45 mounted in the bottom portion of the tank. After the contents of the mixing tank 10 have been sucked into the vacuum tank 32a the vacuum within this tank can be broken by opening the vacuum breaker 36a thereon. The compressed air or other gas is then forced in the tank to eject the egg material through the screen 45.

From the above description of the illustrated apparatus it is evident that the process of this invention can be carried out on many forms of apparatus and that the particular forms described are intended to represent examples of types of apparatus that can be used.

The process of this invention provides for the filtration of slimy difficultly filterable egg meats to produce a filtered product free from unbroken chalaza, shell fragments, dirt and lumps. The egg material is not whipped into a frothy mass during the filtration operation since superatmospheric pressures for effecting the filtration are not used.

I am aware that numerous details of the process may be varied through a wide range without departing from the principles of this invention, and I, therefore, do not purpose limiting the patent granted hereon otherwise than necessitated by the prior art.

I claim as my invention:

1. The method of filtering eggs which comprises stirring a mass of broken egg material containing egg shell fragments, chalaza, egg meats and the like from beneath the surface of said mass to produce a mixture of uniform color without incorporating large amounts of air into the mass, sucking the egg meats of said uniformly mixed mass through a barrier which will retain the shell fragments thereon and simultaneously disintegrating the chalaza as it collects on the barrier to a size small enough to pass through the barrier.

2. The method of filtering eggs which comprises collecting a mass of broken egg material containing egg shell fragments, chalaza, egg meats and the like on one side of a foraminous barrier, evacuating the other side of said barrier to suck egg meats from the mass through the foramina of the barrier and simultaneously disintegrating the chalaza as it collects on the barrier to a size small enough to pass therethrough.

3. The process of filtering eggs which comprises collecting a mass of broken egg material containing egg meats, chalaza, lumps, shell fragments and the like on one side of a foraminous member having foramina of a size permitting passage of egg meats and disintegrated chalaza therethrough but retaining shell fragments, unbroken chalaza, lumps and the like thereon, evacuating the other side of said foraminous member to suck the egg meats therethrough without incorporating air therein and thereby preventing a foaming of the egg meats and simultaneously scraping the unfiltered egg material on the foraminous member to clean the member and to cut up egg chalaza having portions passed partly through the foramina to permit a complete passage of said portions and thereby prevent a clogging of the member while effecting a disintegration of the chalaza.

4. The process of filtering eggs which comprises mixing a mass of broken egg material containing egg meats, chalaza, lumps, shell fragments and the like to produce a homogeneous mass of uniform color, collecting said mass on one side of a foraminous member having foramina permitting the passage of egg meats and disintegrated chalaza but withholding the shell fragments and unbroken chalaza thereon, venting the mass to the atmosphere, evacuating the other side of said foraminous member for creating a pressure differential to force the egg meats through the foramina and simultaneously scraping the unfiltered egg material on the foraminous member to release portions of materials that have been partly drawn through the member but which are held by cohesion with other portions, to move the unfiltered portions away from their position on the member for preventing a clogging of the member and to squeeze the egg meats through the member.

FRANK B. LOMAX.